United States Patent [19]

Yamashita

[11] 3,740,689

[45] June 19, 1973

[54] MECHANO-ELECTRICAL TRANSDUCER DEVICE

[75] Inventor: Akio Yamashita, Ikeda-shi, Japan

[73] Assignee: Matsushita Electric Industrial Co., Ltd., Osaka, Japan

[22] Filed: Nov. 30, 1971

[21] Appl. No.: 203,231

[30] Foreign Application Priority Data

Nov. 30, 1970 Japan ............................ 45/106525

[52] U.S. Cl. .......... 338/2, 73/88.5 SD, 317/235 A, 317/235 M, 317/235 AD, 338/5

[51] Int. Cl. ............................................ G01l 1/22

[58] Field of Search ................ 338/2; 317/235 AD, 317/235 M, 235 A; 148/33; 73/88.5 SD, 88.5 R

[56] References Cited

UNITED STATES PATENTS

| | | | |
|---|---|---|---|
| 3,215,568 | 11/1965 | Pfann | 148/33 |
| 3,270,258 | 8/1966 | Gault | 317/235 AD |
| 3,553,498 | 1/1971 | Yamada | 317/235 AD |
| 3,465,176 | 9/1969 | Tanaka | 317/235 M |

FOREIGN PATENTS OR APPLICATIONS

| | | | |
|---|---|---|---|
| 1,206,299 | 9/1970 | Great Britain | 317/235 M |

*Primary Examiner*—C. L. Albritton

*Attorney*—Richard K. Stevens, Davidson C. Miller, Ellsworth H. Mosher et al.

[57] ABSTRACT

A mechano-electrical transducer device having a high stress sensitivity and high reliability comprising a semiconductor device including a thin single crystal semiconductor wafer having a narrow portion, said semiconductor device having a controllable function.

6 Claims, 9 Drawing Figures

MECHANO-ELECTRICAL TRANSDUCER DEVICE

This invention relates to a mechano-electrical transducer device using a semiconductor.

Conventionally, there have been developed various types of mechano-electrical transducers using semiconductor, but most of them utilize piezo-resistive effect, such as one in which a stress is applied to a thin semiconductor single crystal and derived as the resistance variation, or one using a semiconductor evaporated film.

These conventional devices have such drawbacks that the sensitivity is low and that the sensitivity for an applied stress cannot be controlled from an external circuit.

This invention eliminates these drawbacks and provides a mechano-electrical transducer comprising a semiconductor device being controllable by an electric field and including a semiconductor wafer having an extremely small thickness compared with the length thereof and having a narrow or constructed portion in a direction other than the thickness, particularly in a direction perpendicular to the direction of stress application, in which a stress is applied to said semiconductor wafer and the characteristic of the field effect type semiconductor device is altered.

Now, description will be made in more detail of the invention referring to the accompanying drawings, in which:

FIGS. 1*a* and 1*b* are a schematic plan view and a cross sectional diagram of an embodiment of a mechano-electrical transducer according to the invention;

Figure 1A:
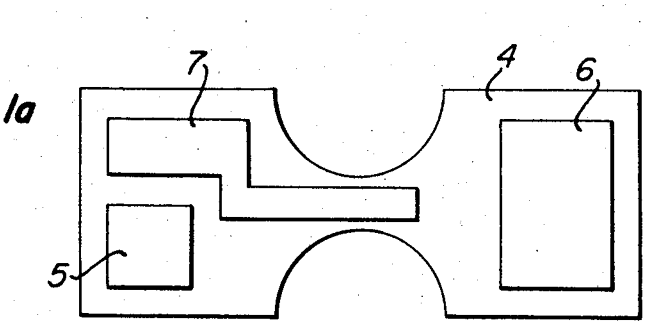
Figure 1B:
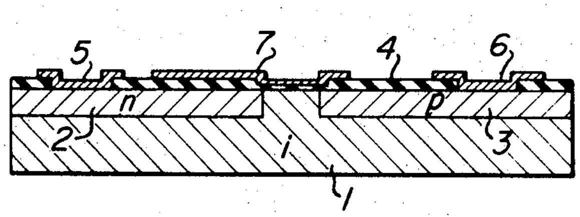

In FIG. 1, a transducer in the form of a field effect type p-i-n diode is shown as an embodiment of the invention. In the figure, the transducer comprises a semiconductor body 1 of high resistivity, an n type region 2 formed in said semiconductor body 1, a p-type region 3 formed in said semiconductor body, an insulating layer 4 formed on a principal surface of the semiconductor body 1, electrodes 5, 6 and 7 formed on the n-type region 2, the p-type region 3 and the insulating layer 4. Here, the semiconductor body 1 is only needed to have a higher resistivity than those of the regions 2 and 3, and the conductivity types n and p may be mutually reversed without influencing the principles of the invention. The thickness of such a semiconductor is made extremely thin compared with the dimension in the length direction, and a narrow or constricted portion is formed as is shown in FIG. 1*a*. Here, the thickness is preferably less than 100 $\mu$ m and the shape of the narrow portion is arbitrarily provided in that it works to concentrate the applied stress.

Figure 2:
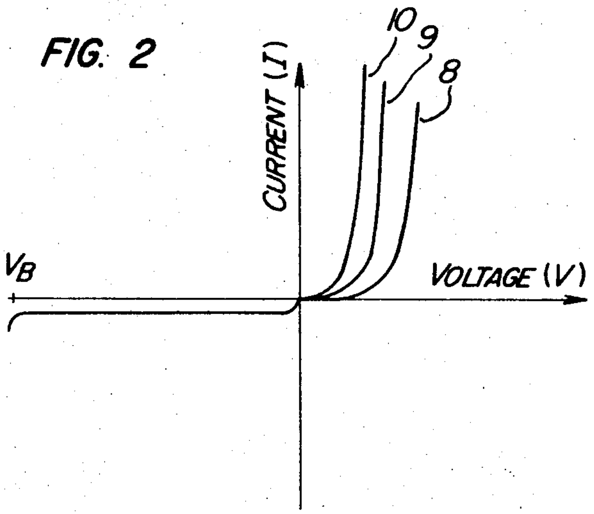
FIG. 2 shows voltage vs. current characteristic curves of the transducer shown in FIG. 1.
Figure 3:
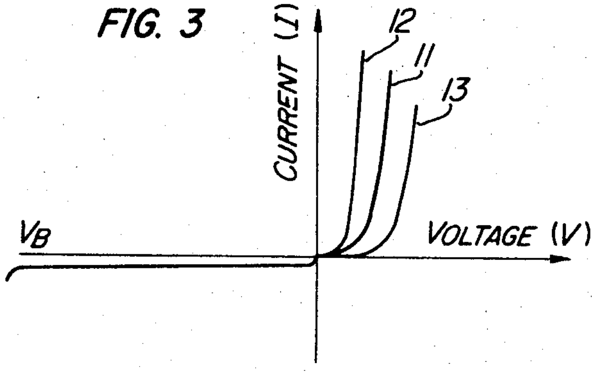
FIG. 3 shows voltage vs. current characteristic curves of the transducer shown in FIG. 1 under the application of a stress.

The current vs. voltage characteristics between the electrodes 5 and 6 of this semiconductor device are as shown in FIG. 2. When the electrode 5 becomes a positive electrode with respect to the electrode 6 the forward bias is applied therebetween, with the result that the forward current increases as shown by curves 8, 9 and 10 when a successively higher bias voltage is applied to the electrode 7. Here, the curve 8 shows the case when no bias is applied to the electrode 7 and curves 9 and 10 show the case when a bias is applied. As for the reverse direction, the breakdown voltage $V_B$ decreases when a bias is applied to the electrode 7. When a stress is applied to a semiconductor device having such characteristics, the characteristics of the device change as shown in FIG. 3. In the forward direction, a large change is observed in that curve 11 represents the case of no stress application, curve 12 the case of contracting stress and curve 13 the case of stretching stress. In a reverse direction, the breakdown voltage $V_B$ tends to decrease in the case of contracting stress and increase in the case of stretching stress. Further, in FIG. 3 the voltage applied to the electrode 7 is not changed, but when this gate voltage is lowered the stress sensitivity is lowered and when heightened the stress sensitivity is heightened. This fact that the stress sensitivity can be changed by this gate voltage forms one feature of the invention.

Through out the description, the term "semiconductor" means Ge, Si, GaAs, GaP, CdS, InAs, etc.

Figure 4:
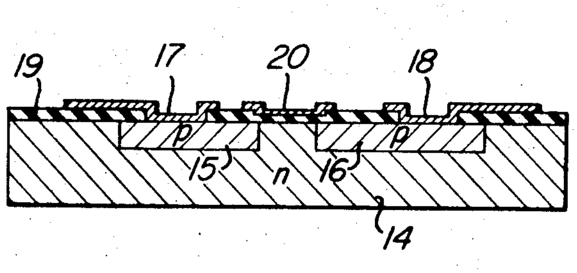
FIGS. 4, 5 and 6 are cross sectional diagrams of other embodiments of mechano-electrical transducers according to the invention.
Figure 5:
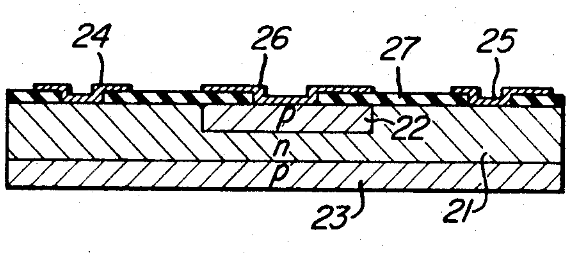
Figure 6:
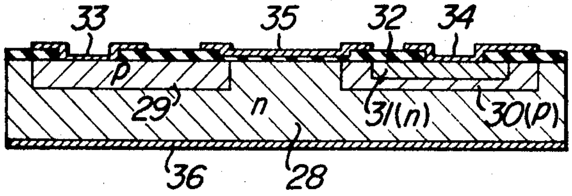

Further embodiments of semiconductor element according to the invention are shown in FIGS. 4 to 6. FIGS. 4 and 5 show examples of field effect type transistor, and more particularly FIG. 4 shows an insulated gate type field effect transistor comprising an n type semiconductor body 14, p-type regions 15 and 16 formed in said body, electrodes 17 and 18 formed on and for the regions 15 and 16 respectively, an insulating layer 19 formed on the body 14 including the regions 15 and 16, and a gate electrode 20 formed on the insulating layer 19.

FIG. 5 shows a depletion layer gate type field effect transistor comprising an n type semiconductor body 21, a p type region 22 formed in the body 21, a p-type region 23 forming a junction with the body 21, electrodes 24, 25 and 26 formed on the body 21 and the p-type region 22 as shown in the figure, and an insulating layer 27 formed on the body including the p type region 22. In this case, the width of the depletion layers in the p type regions 22 and 23 is changed by the application of a bias voltage to control the current flowing between the electrodes 24 and 25.

FIG. 6 shows an insulated gate type thyristor comprising an n-type semiconductor body 28, p-type regions 29 and 30 formed in the body 28, an n-type region 31 formed in the p type region 30, an insulating layer 32 and electrodes 33, 34, 35 and 36 formed on the p type region 29, the n-type region 31, the insulating layer 32 and the body 28. The negative resistance characteristics between the electrodes 33 and 34 are controlled by the voltage applied to the gate electrode 35. The electrode 36 is another control electrode which can also control the negative resistance.

It is to be noted that all of the above semiconductor elements have thin thickness and a narrow portion as shown in FIG. 1*a*. Thus, the portion having a controlling function for the semiconductor element is located in the narrow portion. This has an effective function during stress application and heightens the stress sensitivity.

Further, the principles of this invention will similarly work when respective conductivity types n and p are interchanged.

Next, a more concrete embodiment of this invention will be described.

Figure 7:
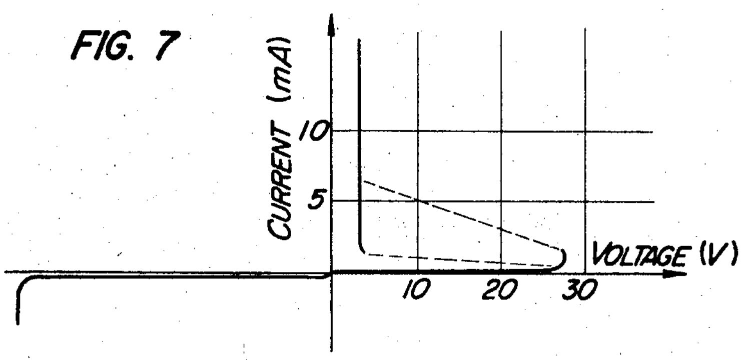
FIG. 7 shows voltage vs. current characteristic curves of the device shown in FIG. 6.
Figure 8:
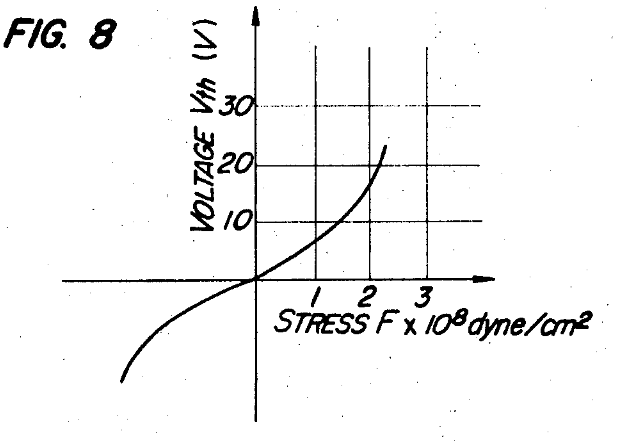
FIG. 8 shows voltage vs. stress characteristic curves of the device shown in FIG. 6 under the application of a stress.

An insulated gate type thyristor as shown in FIG. 6 was made by using an n-type silicon semiconductor, forming p- and n-type regions in said semiconductor by conventionally known impurity diffusion techniques, and the forming of aluminium electrodes. The current vs. voltage characteristics of this element are shown in FIG. 7. A negative resistance was obtained in the forward direction. The element was turned on by applying a gate voltage of 10 V and turned off by cutting off the gate voltage. When a stress was applied to this element, the threshold voltage $V_{th}$ changed as shown in FIG. 8: decreased in the case of a contracting force and increased in the case of a stretching force. This curve changed with the gate voltage and increased the slope when the gate voltage was increased.

As has been clearly described above, the mechano-electrical transducer according to this invention has significant features in that the operation is stable and the stress sensitivity can be controlled from an external circuit, and thus it has wide industrial value to be used as a switch or a sensor.

What is claimed is:

1. A mechano-electrical transducer device comprising a field-effect type semiconductor device being controllable by an electric field including a semiconductor wafer having an extremely small thickness compared with the length and a narrow portion in a direction other than the thickness direction, said semiconductor wafer being adapted to be applied with a stress to change the characteristics of said field effect type semiconductor device.

2. A mechano-electrical transducer device according to claim 1, in which said semiconductor wafer has a p-i-n type structure.

3. A mechano-electrical transducer device according to claim 1, in which said semiconductor wafer has a p-n-p type structure.

4. A mechano-electrical transducer device according to claim 1, in which said semiconductor wafer has an n-p-n type structure.

5. A mechano-electrical transducer device according to claim 3, in which said semiconductor device includes an electrode associating with at least one of said p-type regions and at least two electrodes associating with said n-type region.

6. A mechano-electrical transducer device according to claim 4, in which said semiconductor device includes an electrode associating with at least one of said n-type regions and at least two electrodes associating with said p-type region.

* * * * *